Jan. 22, 1963 E. R. BILLINGTON 3,074,426
FIXED PRESSURE REGULATOR
Filed July 12, 1960

INVENTOR.
Evans R. Billington
BY
Atty.

3,074,426
FIXED PRESSURE REGULATOR
Evans R. Billington, Lincolnwood, Ill., assignor to The Bastian-Blessing Company, Chicago, Ill., a corporation of Illinois
Filed July 12, 1960, Ser. No. 42,368
1 Claim. (Cl. 137—505.25)

This invention relates generally to fluid flow control devices and in particular to an improved gas pressure regulator construction and arrangement.

Gas pressure regulation employed in a variety of domestic and widening industrial uses is coming more and more to be a critical factor under wider variations in intermediate volume and flow demands. Moreover, in today's trend of modernistic units, it has become necessary to design the component parts of these units within very strict location, weight and size limitations and still maintain the perfection of the operational characteristics of each individual component. More particularly, not only must structure be compact and as service-free as possible because of locations of difficult access, but today's gas regulator devices must also cope with the problem of providing a smooth non-fluctuating discharge flow to the metering device and still provide a minimum of pressure deviation in the system.

Heretofore, to insure a smooth discharge flow, it has been necessary to utilize an enlarged diaphragm in the regulator relative to the metering orifice or to install surge dampening units in the line which unduly reduce the flow capacity, it being well known that each additional unit installed in the flow line will increase the total pressure drop.

It is therefore the primary object of this invention to provide an improved gas regulating device capable of absorbing flow fluctuations without loss of capacity whereby a substantially non-fluctuating constant pressure discharge flow is passed to the metering device or operational unit.

Another object of this invention is to provide an improved gas regulator adaptable for connection to a metering device to insure that a substantially constant pressure enters the inlet of the metering device whereby the metering device may provide more efficient stability and accuracy in a service stage regulator, by cushioning impulse flows and fluctuations in the supply line as well as in the service line.

A further object of the invention is to provide a non-adjustable constant pressure output, first-stage pressure regulator for gas service lines subjected to various demand conditions, that can be inserted in the flow line either at a right angle juncture or in a straight line run and in any relative position.

Another object of the invention is to provide an improved first stage regulator which absorbs the loads and pressure fluctuations for the second stage pressure regulator whereby the second stage regulator may be designed and devoted to considerations of accuracy and sensitivity.

Another object of the invention is to provide a first stage gas pressure control having an orifice permitting a predetermined flow of gas therethrough with a drop in pressure across it to a pressure a little above the output pressure of the second stage regulator with a diaphragm operated valve to maintain substantially the same drop in pressure at lesser flow rates.

A still further object of this invention is to provide an improved gas regulator to effective control the discharge pressure by operation of a controlled inlet pressure which regulates the inlet and out flow.

A further object of this invention is to provide an improved first stage gas regulator in which the discharge port may be threadably connected to the inlet port of a second regulator without the use of an intermediate fitting.

A still further object of this invention is to provide an improved gas regulator which is simple in design, inexpensive to manufacture, and compact in size and weight.

With these objects and other features and advantages of the invention in mind, which will appear from the following description and claim taken in connection with the drawings, the invention consists in the novel construction, arrangement and formation of the parts, wherein:

Figure 1:
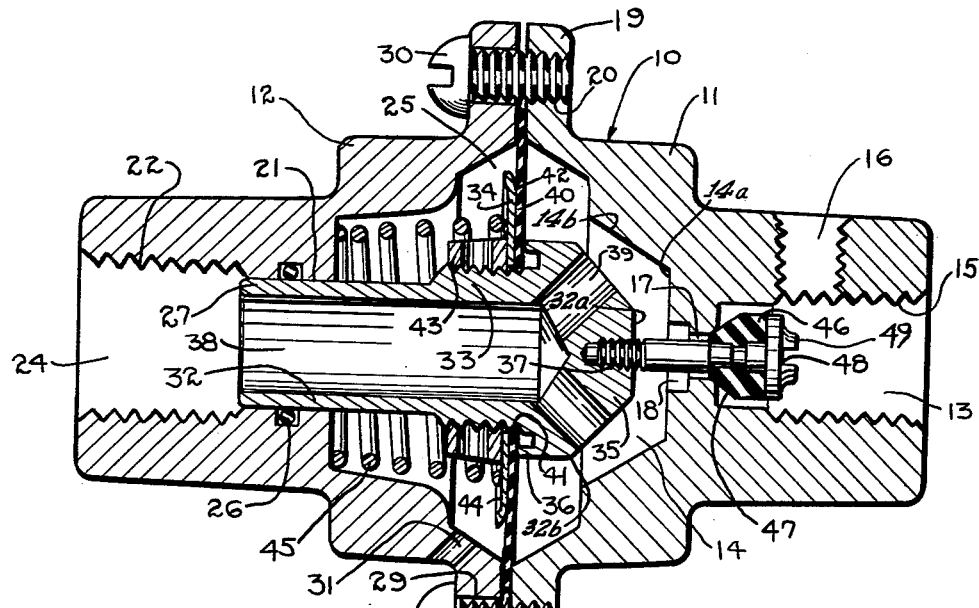
FIG. 1 is a sectioned view in side elevation of the gas regulator of this invention.
Figure 3:
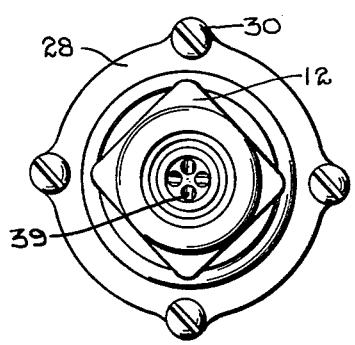
FIG. 3 is a plan view of the gas regulator of this invention.

Referring to the drawings, a preferred form of a fixed pressure gas regulator embodying this invention is indicated generally by the numeral 10, its housing having a body section 11 and a bonnet section 12 separated by a diaphragm 40. The body 11 has an inlet passage 13 passing therethrough and terminating in a pressure chamber 14 below the diaphragm 40. The inlet passage 13 is bifurcated and has a threaded opening at 15 for a straight line connection and threaded opening 16 at a right angle thereto for a right angle connection in a supply line if desired. Whichever opening is unused may be closed by a plug (not shown).

A metering conduit or orifice 17 is concentrically machined to interconnect the flow passage 13 and the pressure chamber 14. A recessed area 18 is formed above the orifice 17 to permit a smooth flow and expansion of the fuel as it leaves the metering orifice 17. The bottom portion of the pressure chamber incudes a radially disposed portion 14a bordered by diverging walls 14b below the diaphragm 40. The body 11 also provides an integrally formed circular clamping flange 19 for the diaphragm 40 and the flange 19 has a plurality of threaded openings 20 equally spaced about its periphery to receive screws 30 for clamping purposes as will be explained later.

Figure 2:
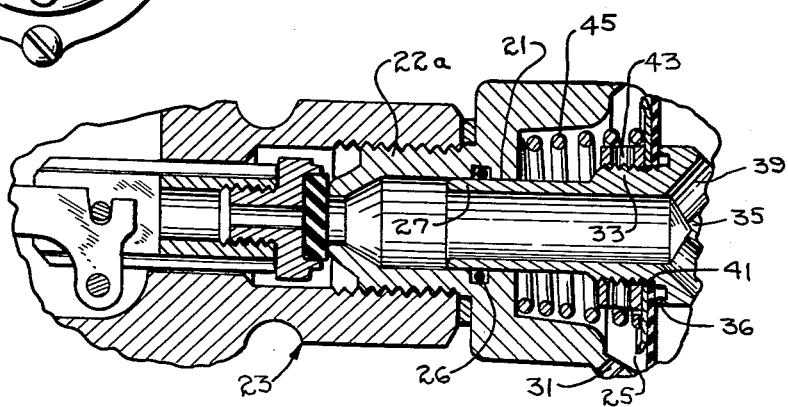
FIG. 2 is a fragmentary partially sectioned view of the discharge port illustrating a direct connection to a second regulator.

The bonnet section 12 has a flow passage 21 therethrough with an internally threaded portion 22 adjacent to the outer end that is adaptable for receipt of a standard connecting nipple. As viewed in FIG. 2, another embodiment of the bonnet section is illustrated wherein an externally threaded portion 22a is provided for direct connection as to a second regulator 23. By having a direct connection of the discharge from the first stage regulator to the inlet of the second stage, not only is a positive seat provided for the second stage regulator, but a short turbulent-free passage is provided to assist the second stage regulator in metering the gas to the high degree of accuracy required. The wall of the outlet passage 21 near the inner end is internally grooved to receive a sealing member in the form of an O-ring 26, through which a stem reciprocates in sealed relationship as will now be explained.

The reciprocating orifice stem 27 has an upper portion 32 which is guided by the flow passage 21. An enlarged center portion 33 of the stem is externally threaded for engagement with a hold down nut 43 for securing a plate 34 into sealing relationship with diaphragm 40, to be described later. A lower portion 35 of the stem provides an extended planar surface 36 in juxtaposition with the central portion 33 to cooperate with the diaphragm plate in clamping the diaphragm to form a leakproof seal about the stem. An internally threaded aperture 37 is centrally machined in the bottom of the valve stem 27 in concentric relationship with the upper stem portion 32. Extending throughout the length of the stem 27 is a flow passage 38 which terminates into the outlet port 24 at one end and into a plurality of openings 39 through a frusta conical surface 32 disposed concentric with the diverging walls 14b, equally spaced about a substantially flat terminal face on the lower stem portion 35 at the other end disposed in the path of flow from the orifice 17. The openings 39 interconnect with the pressure chamber 14 to provide a substantially straight-through flow passage from the inlet port to the outlet port. To those skilled in the art, it is obvious that the straight-through, flow passage provided by the regulator of this invention, permits a non-turbulent flow of gas with a minimum of pressure drop fluctuation across the regulator.

The bonnet 12 also provides an integrally formed circular clamping flange 28 corresponding to the clamping flange 19 of the body 11. A plurality of openings 29 are equally spaced about the periphery of the flange 28 to align with the openings 20 of the flange 19 for receipt of the clamping screws 30. An opening 31 in a side wall of the bonnet 12 provides a vent from a chamber 25 to the atmosphere to establish the operation of the diaphragm 40 in connection with atmospheric pressure. It will be understood that a reference pressure can be applied to the diaphragm if desired, through the opening 31 although atmospheric pressure is the reference pressure normally used.

A diaphragm 40, fabricated from a suitable flexible non-porous material, is detachably secured between the body 11 and the bonnet 12 by the clamping action of the flange portions 19 and 28 as they are joined by the threading of the screws 30. The mating flange surfaces 19 and 28 not only secure the diaphragm 40 in place but also provide a leak-proof seal about the periphery of the regulator and between the chambers 14 and 25. A central opening 41 in the diaphragm 40 allows the stem 27 to pass therethrough with the portion of the diaphragm which immediately surrounds the central opening 41 to be held in sealed relationship between the planar surface 36 of the lower stem portion 35 and the diaphragm plate 34.

In order to hold the diaphragm plate in a tight sealing relationship with the diaphragm and the stem 27, a hold down nut 43 threadably engages the center portion 33 of the stem and bears against an upper surface 44 of the diaphragm plate. The preferred embodiment of nut 43 is shown in FIG. 1 in which diametrically opposed openings are provided on the sides thereof for the engagement of a standard spanner wrench to facilitate assembly. It is obvious, that the clamping action of the diaphragm 40 by the engagement of the plate 34 with the stem 27 in conjunction with the surfaces 36 and 42, will provide an effective seal between the pressure chamber 14 and the bonnet chamber 25. A recessed area is formed on an upper surface 44 of the plate 34 in which is seated a compression spring 45, whose function will be explained later.

To cooperate with the metering orifice 17 in metering the inlet flow, a valve head 49 is secured to the stem portion 27 by the engagement of the head with the threaded aperture 37. This valve head provides a tapered or conical shaped seating surface 47 whereby an effective seal is made between the inlet port 13 and the pressure chamber 14 when the conical surface is in contact with the edge of the orifice 17. The body 46 of the valve head 49 which presents a conical or tapered surface 47 is preferably formed of a non-corrosive resilient material such as synthetic rubber. As the valve head moves away from the orifice 17, the flow area will increase thus permitting a greater volume of the gas to be metered. A slot 48 is formed in the end of the valve head 49 to facilitate the assembly of the valve head with the threaded aperture 37 of the stem 27. The openings at 39 permit the incoming gas to flow through the passage 38 to the discharge port 24. As the flow passes from the discharge port 24, the O-ring seal 26 will keep the gas from entering the chamber 25. The pressure in the chamber on the opposite side of the diaphragm 40 is maintained at atmospheric pressure through the vent 31.

In the embodiment shown in the drawings, only the combined forces of the spring 45 and atmospheric pressure act on the uper surface of the diaphragm 40 while the incoming gas acts upon the lower surface of the diaphragm 40. Upon reaching a gauge pressure substantially greater than the force of the spring 45 the valve head 46 is moved by the pressure acting on the diaphragm towards the closed position.

More particularly it will be noted that in the wide open position of the valve 46 the end wall 32a of the stem rests on the bottom 14a. This position is assumed in the unpressurized resting position of the valve and is the position approached as the rate of gas flow increases after the valve opens in operation under pressure working conditions. When the valve opens for the flow of gas, the gas is directed by the conduit 17 to flow as an expanding column against the end face 32a, urging closure of the valve, and is thereby deflected to flow outwardly and upwardly along the walls 14a and 14b in a direction past the ports 39 into the upper part of the valve chamber and against the diaphragm 40 to thereby also urge closing of the valve. These two effects tend to magnify the closing effect of the valve which is one characterized as opening against the flow. The more open the valve, the greater is the reaction against the end wall 32a and the greater the deflection toward the diaphragm.

Although this deflected flow tendency assures a quick effectiveness against the diaphragm for its operation, a build up of pressure occus quickly in the valve chamber below the diaphragm and reacts to redirect flowing gas into the full flow outlets 39 in its expanded condition at the pressure desired. Thus with this directed peripheral flow against this diaphragm, pressure surges into the valve chamber below the diaphragm are immediately effective on the diaphragm for dampening and pressure control reasons.

As surges or fluctuations occur in the inlet 13 or in the discharge line 24, the valve head 49, under the action of the spring 45 and the gas pressure effective on the diaphragm will hunt slightly and quickly find a steady stage position due in part to the slight frictional braking of the O-ring 26 to provide a substantially constant pressure discharge flow. The valve is quite sensitive to pressure changes whether they occur in the inlet lines or the discharge lines of the system due to the straight-through interconnecting flow passage 38 between the inlet and outlet ports. The discharge pressure may be preset at any predetermined level by the proper rate selection of the compression spring 45.

To those skilled in the art, it is readily apparent that with the discharge flow out of the port 24 connected directly to the inlet of a second pressure control device of the same (FIG. 2) or different type, the regulator described will absorb all the shocks and fluctuations due to pressure variations within the flow system and steady the low pressure regulator to a constant performance. Thus, whether fluctuations occur upstream or downstream of the regulator the second pressure control device will be enabled to function more accurately and with greater sensitivity. It is realized that the actual details of the construction may be readily modified and the inventor only intends to be limited to a reasonable interpretation of the appended claims covering the construction as illustrated and described.

What is claimed is:

A gas regulator comprising a body provided with an inlet passage centrally therethrough having a shoulder defining a valve port and radially extending surfaces bordered by diverging walls defining a bottom wall portion of a pressure chamber, a conduit coaxial with said inlet passage interconnecting the valve port and the pressure chamber for providing a smooth flow and expansion of gas fluid as it enters the pressure chamber, a bonnet defining a bonnet chamber and an outlet passage disposed centrally within the bonnet and leading from the bonnet chamber coaxially with the inlet passage, a diaphragm detachably secured between the bonnet and the body closing said pressure chamber beyond said diverging walls, a stem slidably received in said outlet passage extending through the diaphragm and having flow passages therethrough with inlet openings into said pressure chamber through a conical surface disposed within said diverging walls and out of direct gas flow alignment with said conduit, said flow passages being disposed radially outside of a terminal end wall on the stem having a substantially flat area opposite said radially extending surfaces that is greater than that of said conduit and lying in the path of gas flow from said conduit, said stem having in communication with the flow passages a discharge passage of greater flow area therethrough than that of said conduit, a valve head supported on said end wall and disposed within the inlet passage to seat against said valve port, a resilient sealing element disposed between said stem and bonnet, a spring member disposed about said stem within the bonnet chamber to urge said valve head to its unseated position to effectively meter the inlet flow to the pressure chamber as the stem reciprocates under an opening force of the spring member and a closing force of pressure of the gas fluid flowing in the pressure chamber below the diaphragm to provide a discharge flow from the inlet passage to the outlet passage at substantially a constant pressure.

References Cited in the file of this patent

UNITED STATES PATENTS

| | | |
|---|---|---|
| 478,480 | Sweeny | July 5, 1892 |
| 921,272 | McCarthy | May 11, 1909 |
| 1,731,519 | Bastian | Oct. 15, 1929 |
| 2,635,392 | Gratzmuller | Apr. 21, 1953 |
| 2,675,649 | Trevaskis | Apr. 20, 1954 |
| 2,888,949 | Evans | June 2, 1959 |
| 2,918,079 | Krow | Dec. 22, 1959 |
| 2,004,686 | McKee | Oct. 17, 1961 |

FOREIGN PATENTS

| | | |
|---|---|---|
| 15,083 | Great Britain | July 9, 1898 |
| 816,756 | Great Britain | July 15, 1959 |